(12) United States Patent
Lo et al.

(10) Patent No.: US 8,196,033 B2
(45) Date of Patent: *Jun. 5, 2012

(54) CONVERTING BETWEEN DATA SOURCES AND XML

(75) Inventors: Ming-Ling Lo, Yorktown Heights, NY (US); Shyh-Kwei Chen, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 584 days.

This patent is subject to a terminal disclaimer.

(21) Appl. No.: 12/263,505

(22) Filed: Nov. 2, 2008

(65) Prior Publication Data

US 2009/0063554 A1 Mar. 5, 2009

(51) Int. Cl.
 G06F 17/00 (2006.01)
 G06F 7/00 (2006.01)
(52) U.S. Cl. ........ 715/234; 715/227; 715/230; 715/760; 707/705; 707/763; 707/803
(58) Field of Classification Search .................. 715/200, 715/204, 205, 226, 229, 230, 234, 235, 236, 715/239, 249, 255, 256, 265, 267, 700, 760, 715/762, 201, 209, 213, 227, 231, 232, 233, 715/243, 251, 252, 254, 273, 274; 707/602, 707/705, 713, 762, 763, 769, 772, 609, 635, 707/661, 695, 802, 803, 805, 806, 809
See application file for complete search history.

(56) References Cited

U.S. PATENT DOCUMENTS

| | | | |
|---|---|---|---|
| 5,937,409 A | 8/1999 | Wetherby | 707/103 R |
| 6,125,391 A | 9/2000 | Meltzer et al. | 709/223 |
| 6,226,675 B1 | 5/2001 | Meltzer et al. | 709/223 |
| 6,289,334 B1 | 9/2001 | Reiner et al. | |
| 6,366,934 B1 | 4/2002 | Cheng et al. | 715/513 |
| 6,393,466 B1 | 5/2002 | Hickman et al. | 709/214 |
| 6,397,232 B1 | 5/2002 | Cheng-Hung et al. | 715/523 |
| 6,418,400 B1 * | 7/2002 | Webber | 703/22 |
| 6,418,448 B1 | 7/2002 | Sarkar | 707/104.1 |
| 6,507,856 B1 | 1/2003 | Chen et al. | 715/513 |
| 6,519,617 B1 | 2/2003 | Wanderski et al. | 715/513 |
| 6,535,896 B2 | 3/2003 | Britton et al. | 715/523 |
| 6,549,922 B1 | 4/2003 | Srivastava et al. | 707/205 |
| 6,584,459 B1 | 6/2003 | Chang et al. | 707/3 |
| 6,593,936 B1 | 7/2003 | Huang et al. | 345/619 |
| 6,601,071 B1 | 7/2003 | Bowker et al. | 707/102 |
| 6,635,088 B1 | 10/2003 | Hind et al. | 715/513 |
| 6,711,590 B1 | 3/2004 | Lennon | 707/200 |

(Continued)

OTHER PUBLICATIONS

M. Ginsburg, "Annotate! A Tool for Collaborative Information Retrieval," IEEE, Jun. 1998, pp. 75-80.

(Continued)

*Primary Examiner* — Maikhanh Nguyen

(74) *Attorney, Agent, or Firm* — Gail H. Zarick; Anne V. Dougherty

(57) ABSTRACT

A mapping language, insertable into a DTD, allows automatic mapping from data sources into XML. A mapping results from the establishment of a correspondence between entities in a data source on the one hand and lists and scalars on the other hand. The language maps the lists and scalars to XML elements and attributes. The mapping language includes two constructs: the binding specification and the value specification. The value specification associates with a value or choice declaration. The binding specification includes at least one variable/expression pair. The constructs are insertable into a DTD to create an annotated DTD.

19 Claims, 10 Drawing Sheets

U.S. PATENT DOCUMENTS 6,754,648 B1     6/2004     Fittges et al. ................... 707/1
7,287,018 B2 *   10/2007   Lennon ......................... 707/694

OTHER PUBLICATIONS

T. Kasukawa et al., "A new Method for Maintaining Semi-Structured Data Described in XML," IEEE Aug. 1999, pp. 258-261.

"MAP (mathematics)", www.wikipedia.org (May 2008) (not prior art, but rather information about a definition).

"Language", www.wikipedia.org (as submitted to the PTO in Jan. 2006—again not believed to be prior art but rather a definition).

Florescu et al., "Storing and Query XML Data using an RDMBS", IEEE Copyright 1999, pp. 27-34.

Chaitanya Baru, "Xviews: XML views of relational schemas," Database and Expert Systems Applications, IEEE, Sep. 1999, pp. 1-6.

Papakonstantinou et al., Enhancing Semistructured Data Mediators with Document Type Definitions, Data Engineering, IEEE, Mar. 1999, pp. 1-10.

Seligman et al, "XML Query Language requirements of Large, Heterogeneous Organizations," QL Papers, www.w3.org, pp. 1-4.

Aaron Weiss, "XML Gets Down to Business," ACM, Sep. 1999, pp. 36-43.

Yoo et al., "Automatic Generation Algoritm of Uniform DTD for Structured Documents," IEEE TENCON 1999, pp. 1095-1098.

Mecca et al., "Do we really need a new query language for XML," W3C Query Languages Workshop, www.w3.org, 1998, pp. 1-6.

Pekka Kilpelainen, SGML & XML Content Models, IEEE, May 1998, pp. 1-16.

Tim Bray, "How the Annotated XML Specification Works," Sep. 12, 1998, pp. 1-6.

Extensible Markup Language (XML) 1.0, W3C Recommendation Feb. 10, 1998, http://www.w3.org./TR/REC-xml, Oct. 4, 1999, pp. 1-41.

A. Deutsch et al, "Storing Semistructured Data with STORED," SIGMOD '99, International Conf. Management of Data, Philadelphia, PA (AMC 1999) pp. 431-442.

V. Christophides et al., "From Structured Documents to Novel Query Facilities," Proc. ACM SIGMOD International Conf. Management of Data, pp. 313-324, 1994.

K. Boehm et al., "Structured Document Storage and Refined . . . ", VLDB J. vol. 6(4), pp. 296-511, Nov. 1987.

M. Volz et al, "Applying a flexible OODBMS-IRS-Coupling to Structured Document Handling," 12th ICDE , pp. 10-19, New Orleans, 1996.

Tsatalos et al, "The GMAP, A Versatile Tool for Physical Data Independence," Proc. 20th International VLDB Con. pp. 367-379 (1994).

M. Carey et al. "Towards Heterogeneous Multimedia Information Systems . . . ," Proc. 5th Int'l Workshop on RSCH . . (RIDE): Distributed Object Management (1995) pp. 124-131.

A. Deutsch, "A Query Language for XML," A position paper for W3G query language workshop, (1998) http://ww8.or/w8-papers/lc-xml/query/query.html.

A. Malhotra et al., "RDF Query Specification," Position paper for W3C Query Language Worshop,http:/www.w3.org/TanS/QL98/pplrdfquery.html (1998).

J. Robie et al., "XML Query Language (XQL)," Position Paper for W3C Query Language Workshop (1998) http//www.w3c.org/TandS/QL/QL98/pp/xql.html.

J. McHugh et al., "Query optimization for XML," Proc. 5th International Conf. on Very Large Data Bases (1999).

V. Christophides et al., "From Structured Documents to Novel Query Facilities," Proc. ACM SIGMOD International Conf. Management of Data, pp. 313-324, May 1994.

Volker Turau, "Making legacy data accessible for XML applications," FH Wiesbaden, U. Applied Sciences, Department of Computer Sciences, Jul. 1999, pp. 1-11.

Daniela Florescu et al., "A Performance Evaluation of Alternative Mapping Schemes for Storing XML Data in a Relational Database," INRIA, May 1999 pp. 1-34.

Sudarshan, S. Chawathe, "Describing and Manipulating XML Data," Bull. IEEE Comp. Soc. Tech. Comm. Data Egrg, pp. 1-7 (? 1999).

Takeyuki Shimuna et al., "Storage and Retrieval of XML Documents Using Object-Relational Databases," Inf. Sci. Nara Inst. Sci. & Tech.—Japan, pp. 1-12, date unclear.

Ralf Behrens et al., "Is XML really enough?" Medizinische Universitat zu Lubeck Germany, pp. 1-18, date unclear.

Jaroslav Pokorny, "XML Functionality," Department of Software Engineering, pp. 266-274 0-7695-0789-1/00 IEEE (?2000).

"Extensible Markup Language (XML) 1.0: w3c Recommendation Feb. 10, 1998," http://www.w3.org/TR/REC-xml.

A. Deutsch et al., "Storing Semistructured Data with STORED," SIGMOD '99, Int'l Cont. Mgmt. Data, Philadelphia OA (ACM 1999) pp. 431-442.

"XML in 10 Points," http://www.w3.org/XML/1999/XML-in-10-points (Mar. 27, 1999).

* cited by examiner

```
301 — <!DOCTYPE PO [
302 — <!ELEMENT PO (id, buyer, seller, (lineitem)+)>    — 320
303 — <!ELEMENT id (#PCDATA)>
323 — <!ELEMENT buyer (address)>
      <!ATTLIST buyer
                name CDATA #REQUIRED>
304 — <!ELEMENT seller (address)>
324 — <!ATTLIST seller
                name CDATA #REQUIRED>
311 — <!ELEMENT address (#PCDATA)>
307 — <!ELEMENT lineitem (prodname, amount)>
308 — <!ELEMENT prodname (#PCDATA)>
310 — <!ELEMENT amount (#PCDATA)>
      ]>
```

```
<!DOCTYPE PO [
<!ELEMENT PO (id, buyer, seller,
          (lineitem)*> ::v:= row(lineitem, poid, PO.poid(r))  )>       ⟵ 505
   500                                           ::r:=row(PO, poid, x) ⟵ 510
<!ELEMENT id (#PCDATA:PO.poid(r) )> ⟵ 515
<!ELEMENT buyer (address)> ::s:= row(company, id PO.buyer(r))  ⟵ 535
<!ATTLIST buyer
          name CDATA #REQUIRED :company.name(s)>     ⟵ 520
<!ELEMENT seller (address)> ::s:= row(company, id, PO.seller(r))  ⟵ 540
<!ATTLIST seller
          name CDATA #REQUIRED :company.name(s)>
<!ELEMENT address (#PCDATA :company.addr(s) )>
<!ELEMENT lineitem (prodname,                                            ⟵ 545
          amount)> ::v:= row(prod, prodid, lineitem.prodid(w))   ⟵ 525
<!ELEMENT prodname (#PCDATA :product.prodname(v) )>
<!ELEMENT amount (#PCDATA :lineitem.amount(w) )>
]>
```

FIG.5

```
<PO>
    <id> 100 </id>
    <buyer name="CITIBANK">          —1005
        <address> NY </address>
    </buyer>              —1010
    <seller name ="IBM">
        <address> NY </address>
    </seller>
    <lineitem>
1010 —
        <prodname> THINKPAD </prodname>
        <amount> 20K </amount>
1015 — </lineitem>
    <lineitem>
        <prodname> SERVER </prodname>
        <amount> 100K </amount>
    </lineitem>
</PO>
```

FIG.10

CONVERTING BETWEEN DATA SOURCES AND XML

BACKGROUND OF THE INVENTION

1. Field of the Invention

The invention relates to the field of conversion of data from one format to another within a digital data processing device or devices.

2. Background of the Invention

XML ("Extensible Markup Language") is a proposed standard for exchanging semi-structured data. It can be used as an alternative to HTML. More information about XML can be found in "Extensible Markup Language (XML) 1.0: W3C Recommendation 10—February 1998" http://www.w3.org/TR/REC-xml and in E. H. Harold, *XML Extensible Markup Language*, (IDG Books 1998).

It is expected that the consumption of XML documents will continue to grow. Business entities increasingly exchange XML documents as part of their business logic flow. Several technical and business organizations have published XML schemes for key document types in specific domains. Web sites such as www.xml.org have been established to coordinate such activities and maintain XML schemes. Existing and new applications also increasingly use XML as their input and output format. Major software vendors, such as those of browsers and relational and object databases, have either provided or announced support for the XML format, while many applications are being enhanced with XML capabilities. If data must be taken manually from other data sources, and integrated into XML documents, then data exchange is slowed.

In A. Deutsch et al, "Storing Semistructured Data with STORED", SIGMOD '99, International Conf. Management of Data, Philadelphia, Pa. (ACM 1999), pp. 431-442 a language is proposed for mapping data from relational databases to XML. This technique has the disadvantage that, since it uses relational query constructs directly in the mapping language, it can apply only to relational databases.

SUMMARY OF THE INVENTION

It is an object of the invention to create a mapping suitable for mapping from several types of data sources to XML.

This object is achieved by use a mapping that establishes a correspondence between entities in a data source on the one hand and lists and scalars on the other hand. The language maps the lists and scalars to XML elements and attributes. For the purpose of this application a scalar is a single value and a list is a list of values.

Preferably the mapping involves a mapping language having two types of statements, value specifications and binding specifications.

Preferably also the mapping language is insertable directly in a DTD for a target XML document.

Other objects and advantages shall be apparent from the following.

BRIEF DESCRIPTION OF THE DRAWING

The invention will now be described by way of non-limiting example with reference to the following figures:

FIG. 5 shows an example of an annotated DTD ("DTDSA") in accordance with the invention.

FIG. 10 shows a retrieved XML document (with input x=100)

DETAILED DESCRIPTION OF THE PREFERRED EMBODIMENTS

Definitions

In the column "Name given in", if the value is "here", that means the concept is used in the present document but not defined in the DTD spec. If the value is DTD, that means the concept is referenced, sometimes appears in a production rule, but not explicitly defined in the DTD spec.

Note: Some of the terms are defined in a recursive manner.

| Term | short hand | Definition | Name given in |
|---|---|---|---|
| repetition symbol | | '?', '*', or '+' | here |
| element name | ENAME | Name used in a element type declaration | XML Spec |
| choice list | CLIST | a list of cp enclosed by '(' and ')', and separated by '\|', i.e. "( cp \| cp \| . . . \| cp )". | XML Spec |
| terminal choice list | TCLIST | a list of "#PCDATA" and ENAMEs, each appearing only once, enclosed by '(' and ')', and separated by '\|', i.e. "( #PCDATA \| ENAME \| ENAME . . . \| ENAME )" | here |
| sequence | SEQ | a list of cp enclosed by '(' and ')' and separated ',', i.e, "( cp, cp , . . ., cp)" | XML Spec |
| content unit | CU | ENAME, CLIST, SEQ, or TCLIST | here |
| content particle | CP | a content-unit followed optionally by a repetition symbol, i.e. (Name \| choice \| seq) ('?' \| '*' \| '+')? | XML Spec |
| content spec | content-spec | the part that matches 'contentspec' in the DTD production rules. That is, the part that follows ENAME and proceeds '>' in a DTD element type declaration. | XML Spec |
| children content spec | children | a content spec that is a choice or sequence content unit followed optionally by a repetition symbol | XML Spec |
| PCDATA declaration | PCDATA | #PCDATA | XML Spec |
| attribute definition | ATD | The part that includes an ENAME, a type, e.g., CDATA, | XML Spec |

-continued

| Term | short hand | Definition | Name given in |
|---|---|---|---|
| | | ID, IDREF etc., and a default declaration. | |
| value declaration | | PCDATA declaration or attribute definition. | here |
| Element type declaration | ED | The part that includes a "<!ELEMENT", followed by an ENAME, content-spec, and a ">" | here |
| Attribute list declaration | AD | The part that includes a "<!ATTLIST", followed by an ENAME, a list of ATDs, and a ">" | here |
| DTD declaration | | element type declaration and attribute list declaration | here |
| DTD construct | | a DTD declaration, a (sub-expression of a) content spec, or a (sub-expression of an) attribute-list declaration | here |

Figure 1:
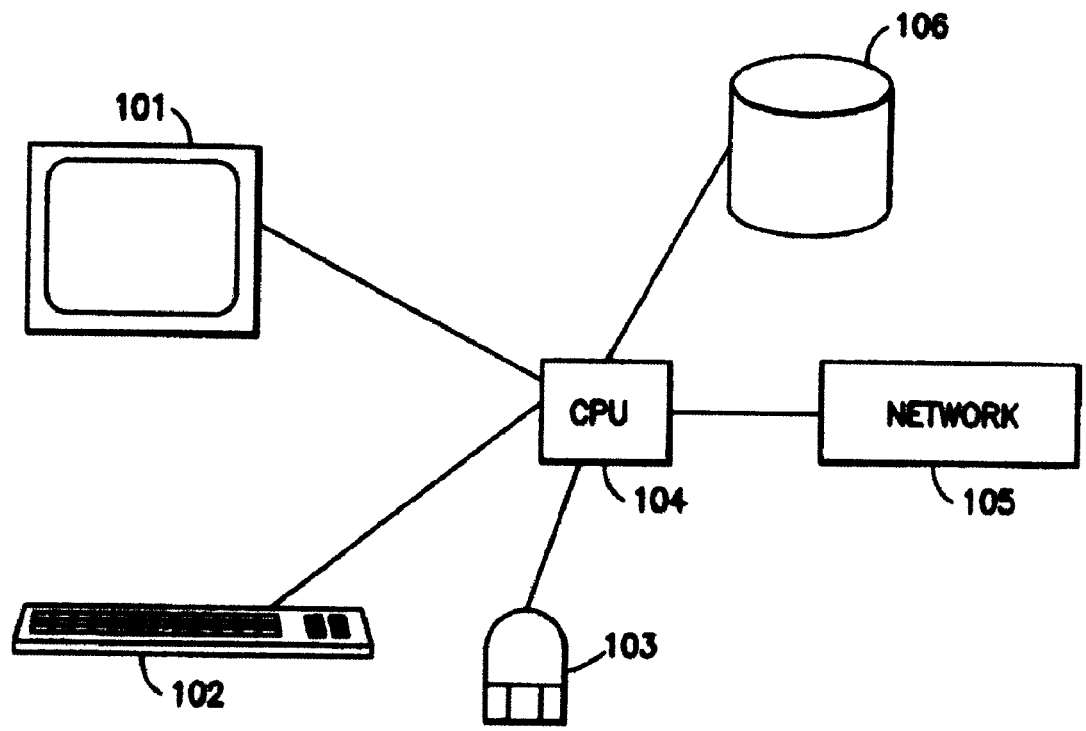
FIG. 1 shows a digital data processing system on which the invention can be implemented.

FIG. 1 shows a digital data processing system on which the invention can be implemented. The system will typically include a CPU 104, a memory device 106, a display device 101, data entry devices such as keyboard 102 and mouse 103, and a network connection 105. The CPU might be any kind of processor such as a PC, any other general purpose processor, parallel processing device, or distributed processing system. The memory device might be of any sort, such as a hard drive, a floppy drive, a zip drive, a CD-ROM drive, or several such devices. Other devices for communication with a user might also be attached.

The network connection will commonly be an Internet connection, but it might also be an Intranet or other local network connection, such as a LAN. Both a local and an external network connection might be present.

The memory device 106 will commonly house data and software. The data will include data that a user may seek to communicate with the outside world or data to be used internally. The software might be of various sorts, including software for implementing the invention. However, the invention might also be implemented in hardware.

While the system shown has a local memory device 106, memory accessible via the network connection 105 might be used instead of a local memory device. Similarly, the CPU 104 might be remote from the display 101 and data entry devices 102 and 103.

A user might seek to communicate data to the external world under many different circumstances.

For instance, suppose a user tracks an inventory of supplies in a relational database within memory device 106. The database program will signal to the user when some inventory item, such as pencils, becomes low. The user may then wish to order the low inventory item via the Internet. The order will typically be expected to be conveyed to the supplier in a standard format, such as an XML purchase order form. The user might fill out the XML purchase order form manually, but this could become burdensome if frequent orders are to be undertaken. It would be desirable for the CPU 104 to convert the low inventory information from the relational database directly onto the standard XML purchase order form. When the inventory items arrive, it would also be desirable for the CPU 104 to convert a standard XML invoice form into relational database information to be stored in the memory device 106.

Another situation where conversion of data might be desirable would arise in compiling web pages. A stockbroker, for example, might maintain a first data base with a customer's investment portfolio information, a second data base with stock quotes, and a third data base with financial analysis information. The stockbroker might want to select and consolidate information from all three data bases to create customized customer web pages, where individual customers could view investment advice. Again, the CPU should automatically convert data from the data bases into an XML document that is displayable as a web page.

The data to be converted need not be from a relational database. It might equally well be object-oriented, semi-structured, or other schemas. Using this framework, one DTD can correspond to multiple heterogeneous data sources, and single data sources may be associated with many different DTD's.

Those of ordinary skill in the art might recognize any number of other situations where conversion of data into XML would be desirable.

Figure 2:
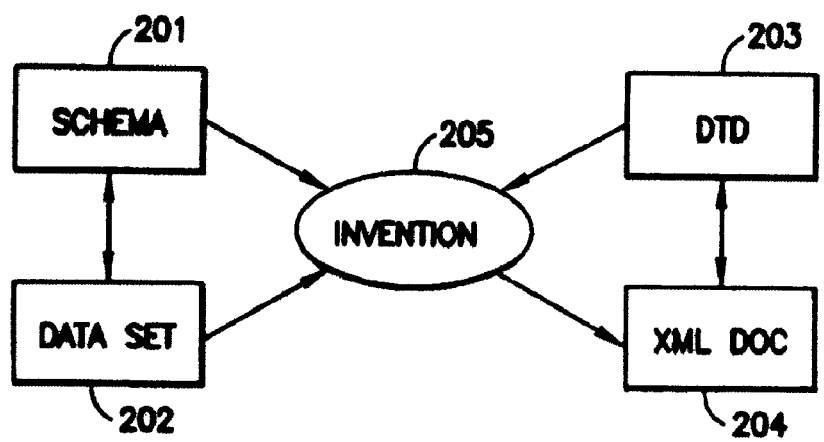
FIG. 2 shows an overview of the function of the invention in context.

FIG. 2 shows a conceptual diagram of the role of the invention. On the left side of the figure, in known fashion, a schema 201 is used to control formatting of a data set 202, such as a relational database. On the right side of the figure, also in known fashion, a DTD 203 is used to control formatting of an XML document 204. In one aspect, the invention 205 is designed to use the schema 201, the data set 202, and the DTD 203 to create an XML document 204. FIG. 2 is only an example. The invention is designed to allow conversion between any data format and XML.

Figure 3A:
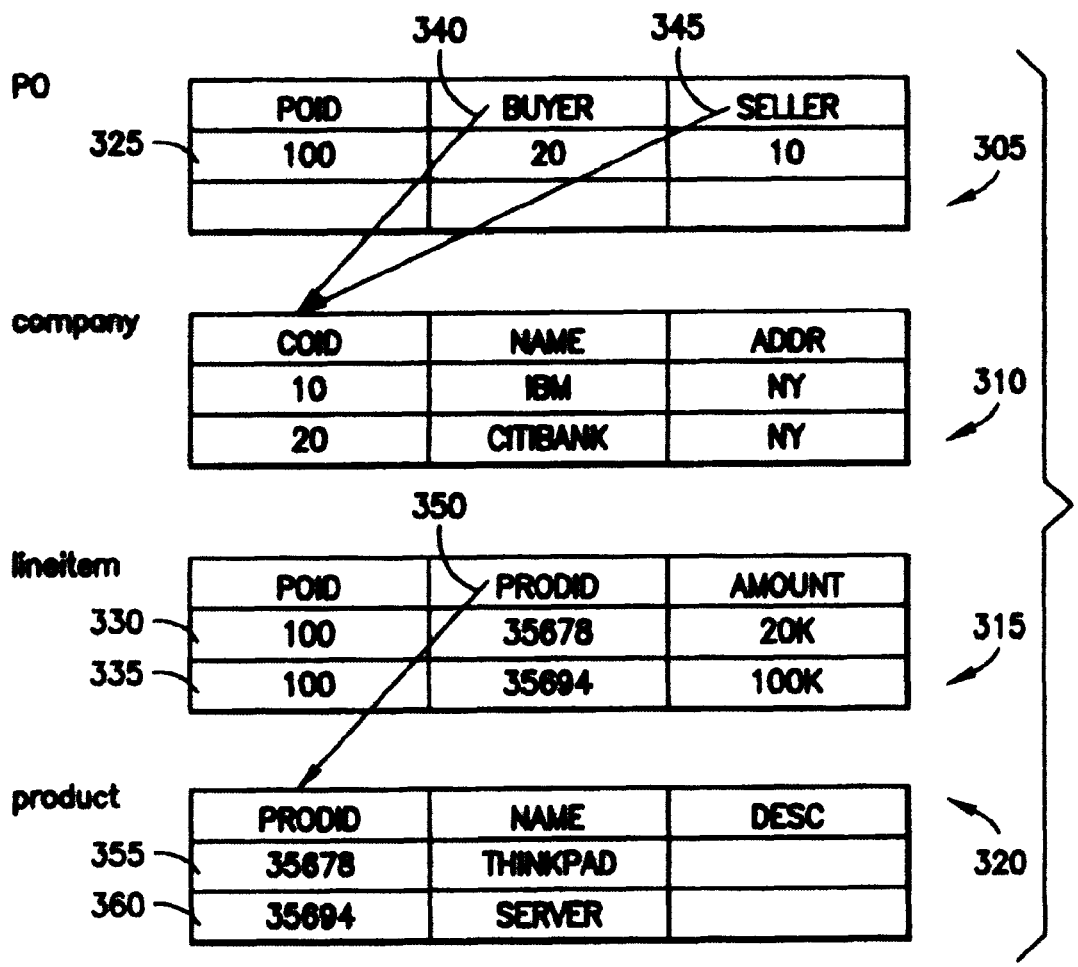
FIG. 3a shows an example purchase order relational schema.

FIG. 3A illustratively includes four relational tables, also known as a relational schema, purchase order ("PO") 305, company 310, lineitem 315, and product 320.

Table 305 has three columns, purchase order identification ("POID"), buyer, and seller. The rows of the table have numerical index values pointing to values for the columns. Thus purchase order number 100 is associated with buyer 20 and seller 10.

Table 310 has three columns: company identification ("COID"), name, and address ("ADDR"). The rows associate numerical values with actual company names and addresses. Thus the numerical value 10 is associated with the company IBM, having an address in New York, and the numerical value 20 is associated with the company Citibank, also having an address in New York.

Table 315 has three columns: POID, product identification ("PRODID"), and amount. The rows, 330 and 335, associate purchase order identification numbers with product identification numbers and quantities. In the figure, purchase order 100 is associated with two product identifications, 35678 and 35694, of which 20 k and 100 k are ordered respectively.

Table 320 has three columns, PRODID, name, and desc. (description). The rows associate product identification 35678 with a "THINKPAD"® and product identification 35694 with a server.

Arrows in FIG. 3a illustrate foreign key relations among various fields. For example, the record 325 in PO table with POID=100 is related via arrows 340 and 345 to two records 330, 335 in the lineitem table 315 with POID=100. Similarly records 330 and 335 are associated via arrow 350 to records 355 and 360.

Figures 3B, 4:
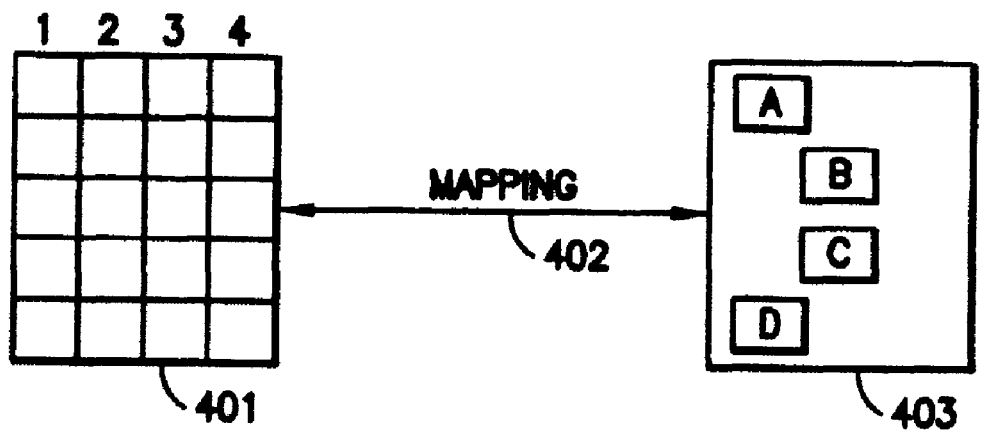
FIG. 3b shows an example DTD
FIG. 4 shows conceptually a mapping between a table and a displayed version of an XML document.

FIG. 3b shows a Document Type Definition ("DTD"). According to the known art, XMI makes use of DTD's to specify documents. DTD's are very flexible and can specify any number of different documents. FIG. 3b shows only one simple example, in which a purchase order is specified.

Line 301 shows the definition of the variable PO. In a tree-like fashion, the definition incorporates child definitions, i.e. "id" defined at line 302, "buyer" defined at line 303, "seller" defined at line 304, and "lineitem" defined at line 307. The asterisk after "lineitem" at 320 indicates that this feature may be repeated any number of times in the purchase order. The definitions of "id" 302, "address" 311, "prodname" 308, and "amount" 309 use the #PCDATA command to get data directly from a data storage device, e.g. 106. The definitions of "buyer" and "seller" have attribute lists at 323 and 324. The definition of line item, also incorporates child definitions, "prodname" at line 308 and "amount" at line 310.

FIG. 4 shows conceptually how data is to be mapped from a relational database into an XML document. Data, such as that referred to in the DTD of FIG. 3 is stored in a relational database in the form of tables 401. The tables have rows and columns, the columns being numbered 1, 2, 3, and 4 in the example. The database information is to be displayed in the form of fields A, B, C, D in the XML document 403. A mapping 402 sends data from the database to the document and back. A mapping might specify A<->1; B<->4; C<->2; and D<->-3—OR a mapping might specify some other correspondence such as A<->3; B<->4; C<->2; D<->1.

In order to achieve such mappings, a mapping language is proposed. Preferably this mapping language is stored as annotations to the DTD. These annotations can be stored in a same computer file with the DTD or in a separate file. If the annotations are stored with the DTD, then they can be stripped off by a simple program prior to generating an XML document.

FIG. 3b is to be annotated based on the relational schema in FIG. 3a, and the resulting annotated DTD ("DTDSA") is illustrated in FIG. 5. FIG. 5 shows a DTD annotated in accordance with the preferred mapping language. The preferred mapping language includes 2 types of constructs: the binding specification and the value specification.

Value Specifications

A value specification is only allowed to associate with either a value or a choice declaration.

A value specification is a parameterized formula containing variables, which, when a data object is substituted for each variable in it, produces a text value. The value specification has the following format:

VCD:sf where VCD is a value or choice declaration, and sf is any scalar-valued function.

Every value declaration in a DTDSA must have exactly one associated value specification. Given a value declaration ("VD") with a value specification ("VS") in some DTDSA, the semantics of the combination is that in every document instance of the DTDSA, the value of every occurrence of VD is determined by VS. As noted earlier, VS may have parameters.

Every choice declaration in a DTDSA must also have an associated value specification. Given a choice declaration CD with a value specification VS in a DTDSA, the semantics of the combination is that in every document instance of the DTDSA, the alternative taken in every occurrence of CD is determined by VS.

Suppose CD=(C1|C2| . . . |Cn) and CD and VS appear as VS:

(C1|C2| . . . |Cn):VS

There are two possibilities. If the value produced by VS is an integer I, with I between 1 and n, the alternative appearing in place of CD is Ci. Alternatively, if the value produced by VS is a string Cj, which matches one of the alternatives C1, C2, . . . , Cn, the alternative taken in place of CD is Cj. If the value produced by VS falls in neither category, the alternative taken in place of CD is undefined. In actual implementations, a user defined default alternative or some error reporting string can be used.

Consider the following example of a DTDSA with a value specification:

```
DTDSA JOB_DESCRIPTION:
<!ELEMENT JOB_DESCRIPTION (SALES|RESEARCH):f(x)>
<!ELEMENT SALES (#PCDATA:"Increase sales volume")>
<!ELEMENT RESEARCH (#PCDATA:"Develop new technology")>
``` where f(x) has the definition:

$$f(x) = \left\{ \begin{array}{l} \text{"SALES", when } x = 1 \\ \text{"RESEARCH", otherwise} \end{array} \right\}$$

The XML document corresponding to the DTDSA given x=1 is:

```
<JOB_DESCRIPTION>
    <SALES> Increase sales volume </SALES>
</JOB_DESCRIPTION>
```

Binding Specification

A binding specification is a variable and expression pair. The expression can be a list of data objects, a formula that identifies a list of data objects, or a parameterized formula containing variables, which, when a data object is substituted for each variable in it, produces a list of data objects. The binding specification has the following format:

$DC::x_1:=vf_1::x_2:=vf_2 \ldots ::x_n:=vf_n$ where DC is any DTD construct that is not a value or choice declaration, $x_i$ is a variable, and $vf_i$ is a binding function for i=1, . . . , n.

A binding specification serves two purposes. First, when immediately following a repetition symbol, it determines the number of times the DTD construct qualified by the repetition symbol repeats in the document instances. Second, it supplies values to the parameters appearing in other value or binding functions. The binding function of this binding specification may itself contain parameters which obtain values from other binding specifications. This feature enables a set of mapping constructs to relate to one another and makes DTDSA flexible enough to represent a large and diverse set of XML documents.

There are parameters in the mapping constructs of a DTDSA that do not always obtain their values from other binding specifications. These parameters are called the input parameters of the DTDSA, and are used to identify specific documents among the set of document instances.

Binding Variables and Function Parameters

To understand how binding specifications supply values to function parameters, it is necessary to introduce the concepts of ancestral relationships and contexts of DTD constructs.

Intuitively, if one envisions every DTD construct in a DTD as a node, and every containment relationship and name reference relationship as an edge, the DTD will form a graph. In most cases, this graph is a directed acyclic graph (DAG), with the root element type declaration of the DTD being the root of the DAG. The edges of the DAG can be considered as denoting an ancestral relationship. For example, in the following DTD

```
<!ELEMENT A (B, C)>
<!ELEMENT B ...>
<!ELEMENT C ...>
``` element type definition A can be considered an ancestor (or parent) of a sequence that is a parent of ename B and ename C. Then ename B and ename C can be considered ancestors of element type definition B and element type definition C, respectively. The ancestral relationship among DTD constructs can be formally defined based on the parent relationship defined as follows:

1. An element type declaration is the parent construct of its content specification.
2. An attribute list declaration is the parent construct of each of its attribute type declarations.
3. For every DTD construct $C_1$ that is a sub-expression of a content specification, the smallest super-expression of $C_1$ that is a DTD construct is its parent.
4. An element name that appears in a content specification is a parent construct of the element type declaration with the same element name. The element type declaration is considered the parent construct of any attribute list declaration with the same element name.

The transitive closure of the parent relationship is the ancestral relationship. The reverse relationship of the ancestral relationship is the descendant relationship.

The ancestral relationships so defined do not always form a DAG. For example, the ancestral relationship in the following DTD contains a cycle:

<!ELEMENT A (#PCDATA|A)*>

When cycles occur in the ancestral relationship, every DTD construct in the cycle becomes the ancestor of every other DTD construct in the cycle. However, the concept of traversing the relationship graph in either the ancestor or descendant direction remains useful.

Some DTD constructs may have more than one parent. As a result, a single DTD construct may represent XML fragments in different contexts in the document instances. For example, in the following DTD

```
<!ELEMENT A (B, C)>
<!ELEMENT B (D)>
<!ELEMENT C (D)>
<!ELEMENT D (#PCDATA)>
``` the element type definition D has two parents, one being the element name D in <!ELEMENT B (D)>, the other that in <!ELEMENT C (D)>. A document conforming to the above DTD follows:

```
<A>
<B><D>first</D></B>
<C><D>second</D></C>
</A>
```

In the document, the element type definition of D corresponds to two elements with the same tag D, but in different contexts, one being the child of element B, the other that of C.

To discuss the different roles played by the same DTD construct, the context of a DTD construct C will be defined to be a unique path from the root construct of a DTD to C in the descendent direction. Where there is a loop in the DTD, there can be an infinite number of contexts for some elements.

Using these concepts, the relationship between binding variables and function parameters is defined as follows: Given a value or binding function associated with a DTD construct in a certain context, a parameter x of the function gets its value form the value bound to the binding variable with the same name, if any, in the binding specification closest to it in context. If such a binding variable does not exist, x is an input parameter of the DTDSA.

The DTDSA for the previous DTD will be:

```
1: <!ELEMENT A (B, C) ::x:=i1 ::y:=i2>
2: <!ELEMENT B (D)    ::y:=x+10>
3: <!ELEMENT C (D)    ::x:=x+20>
4: <!ELEMENT D (#PCDATA :x+y)>
```

The virtual XML document represented by this DTDSA with input parameters of i1=1 and i2=2 can be derived as follows. Initially at line 1, x and y have the values of 1 and 2, respectively. y is redefined to 11 at line 2, while x is redefined to 21 at line 3. the #PCDATA at line 4 has two contexts. In the context of A-B-D, x gets the value of 1, and y gets the value of 11, and the value of #PCDATA is thus 12. In the context of A-C-D, x is redefined to 21 while y remains at 2, and the value of #PCDATA is 23. The whole corresponding XML document is thus

```
<A>
<B><D>12</D></B>
<C><D>23</D></C>
</A>
```

Determining the Number of Repetitions

Let DC denote a DTD construct, x a variable, and vf a list-valued function producing a list of k values {v1, v2, ... vk}. The DTD construct with an associated binding specification (DC)*::x:=vf, can be considered as equivalent to the sequence DC::x:=v1, DC::x:=v2, DC::x:=vk).

Formally, given a DTD construct with an associated binding specification (DC)#::x:=cf, where # is some repetition symbol, the DTD construct is considered equivalent to one of the following, depending on which repetition symbol # is:

1. For #=*:
   If k≧1, (DC)* is equivalent to k consecutive copies of DC. That is, (DC)*::x:vf equiv (DC::x:v1, DC::x:=v2, ..., DC::x:=vk). IF k=0 (i.e. vf evaluates to an empty list), (DC)* is equivalent to an empty string.
2 For #=+:
   If k≧1, (DC)+ is equivalent to k consecutive copies of DC—that is, (DC)+::x:vf equiv (DC::x:=v1, DC::x:= v2, ..., DC::x:=vk). If K=0, (DC)+ is equivalent to one copy of DC with x given an undefined value, i.e., (DC)+::x:=vf≡(DC::x:=undefined).
3. For #=?:
   if k≧1, (DC)? is an equivalent to one copy of DC, and all except the first value produced by vf are ignored. That is, (DC)?::x:=vf equiv (DC::x:=v1). If k=0, (DC)? is equivalent to an empty string.

In general, when DC repeats more than once, as required by one of the rules, each copy of DC sees a different binding of x. When DC is constrained to appear one (or zero) times, but vf produces a list of more than one value, only the first one (or zero) value is used, and all other values are ignored. On the other hand, in the case where DC is required to appear at least once, but vf produces 0 values, the value of binding variable x is undefined. In actual implementations, a user or system defined default value can be supplied to x.

In these discussions, the symbol ":=" denotes neither equality nor simple assignment. Rather it binds the list of values produced by the binding function one after another to the binding variable. The number of values in the list produced by the binding function, together with the above rules, determines the number of times the DTD construct preceding the repetition symbol repeats XML document instances.

Consider the following DTDSA:

```
<!ELEMENT A (B, C) ::x:=i1 ::y:=i2>
<!ELEMENT B (#PCDATA :y)>
<!ELEMENT C (D)* ::z:=intseq(x)>
<!ELEMENT D (#PCDATA) :z)>
``` where the function intseq(x) produces a sequence of integers from 1 up to x. The virtual XML document corresponding to the DTDSA with i1=3 and i2=5 is

```
<A>
<B> 5 </B>
<C> <D>1</D> <D>2</D> <D>3</D> </C>
</A>
```

Some General Comments

The preferred mapping language has the advantage that it can be used to map a wide variety of underlying scheme types, not just relational databases. However, in the following, an illustrative example will be presented which does use a relational database.

The preferred mapping language also allows data from multiple sources to be mapped into one single XML document. These multiple sources can be different data containers from different types of data systems. However, in the illustrative example that follows, the sources are various tables from a relational database.

The mapping language has the advantage that it only has to be done once per DTD (or per XML schema). Mapping XML documents one by one would be less efficient.

Establishing a Mapping

The procedures for establishing a mapping between a given DTD and the underlying data sources include performing the following three parts, where their exact order of execution is immaterial:

Given a DTD,

1. For each DTD construct that ends with a repetition symbol:
   a. Identify a list of data objects, a formula that will identify a list of data objects, or a parameterized formula that will identify a list of data objects when values to the parameters are supplied. For convenience, this will be called the binding formula.
   b. Associate the previous list or formula with a variable name. For convenience, this variable name will be called a binding variable, and the binding variable and binding formula pair a binding specification. After this step, the binding variable can be used in the formula in step 1a for other DTD constructs.
   c. Associate binding specification to the DTD construct.
   d. Optionally repeat this process.
2. For each DTD construct that does not end with a repetition symbol and is not a #PCDATA, a choice list or an attribute definition, optionally associate binding specifications with it (i.e. perform the Steps 1a, 1b, 1c, and 1d).
3. For each DTD subexpression that is a #PCDATA, a choice list or an attribute definition:
   a. Choose a value, a formula that produces a piece of text, or a parameterized formula (function) that will produce a piece of text when the values to the parameters are supplied. For convenience, this value or formula is called a value specification.
   b. Associate the formula with the DTD subexpression.

Note: Whenever a parameterized formula is used, in either a value specification or a binding specification, each parameter in the formula can either be a binding variable used in a higher level binding specification or otherwise. Whenever a binding variable is chosen in a binding specification, the variable can be a parameter used in a lower level specifications or otherwise These choices will affect the contents of XML document extraction, as will be seen later in the XML extraction section.

Alternatively, the above three steps may be performed in any other orders, such as Step 3, Step 1, Step 2, or Step 3, Step 2 or Step 1, etc.

Mapping Variation

If the set of underlying data includes XML text segments, the steps in the described method are modified as follows:

1'. For each DTD construct with an ending repetition symbol:
   a. Associate binding specification or an XML valued value specification with the DTD construct.
   b. Optionally associate more binding specifications to the DTD construct.
2'. For each DTD construct that does not end with a repetition symbol and is not a #PCDATA or an attribute definition,
   a. Optionally associate binding specification or an XML valued value specification with the DTD construct.
   b. Optionally associate more binding specifications to the DTD construct.
3'. For each DTD construct that is a #PCDATA or an attribute definition, associate a non XML-valued value specification with the DTD construct.
4'. For each choice list DTD construct, associate an XML-valued or non-XML valued value specification with the construct.

Figure 6A:
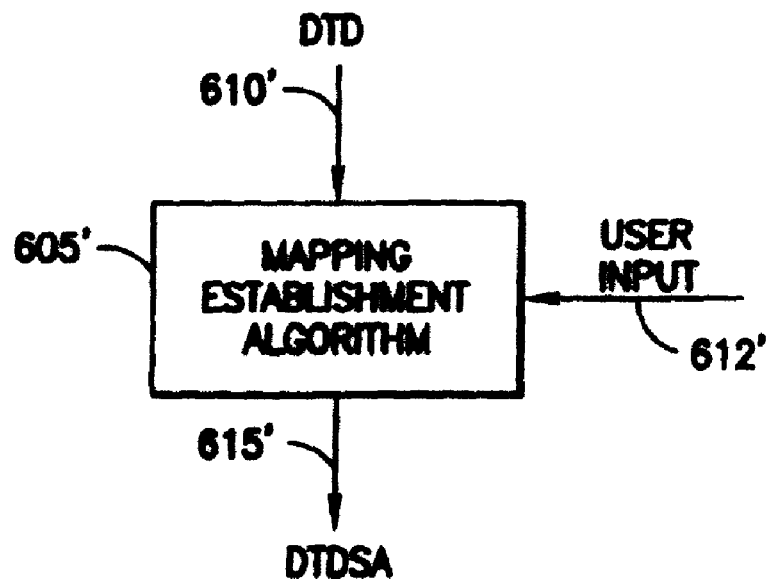
FIGS. 6a & b show an algorithm for establishing the mapping in DTDSA format

FIG. 6A shows an overview of a method for establishing mapping in DTDSA format according to the present invention. At 605', a DTD instance 610' is received, and generates a DTDSA 615' based on some user options 612'.

Figure 6B:
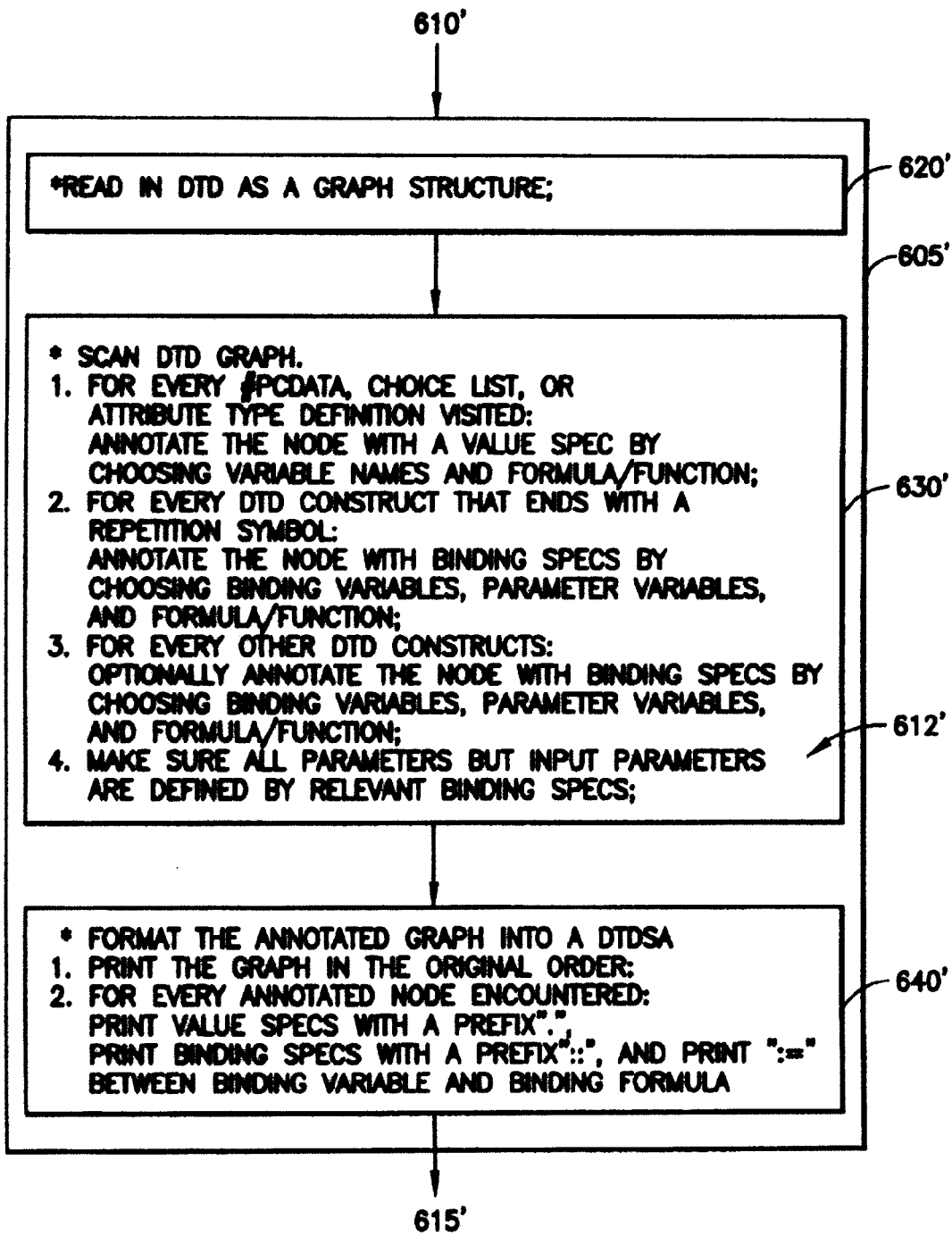

FIG. 6b shows an internal flow diagram of block 605'. Initially the DTD 610' is parsed into some internal format, e.g., a directed acyclic graph, which is easy to manipulate, as shown in block 620'. Several traversals are performed to annotate DTD constructs, which are represented as nodes in the graph, using value or binding specifications, as shown in block 630'. The order of operations shown in FIG. 630' is optional. Any order may be chosen. All the three listed items may include acceptance of user options or inputs for variable names, formula/function selections.

In item 1. of block 630', every #PCDATA, choice list, or attribute definition is visited. These are annotated first with a value specification by choosing variable names and formula/function. In item 2, nodes representing DTD constructs that end with a repetition symbol ("*", "+", "?") are annotated next with binding specifications, by choosing binding variables, parameter variables, and formula/function. For all the other nodes, the binding specification annotation is optional, as shown in item 3. During item 2 and item 3, the binding variables stay related to certain parameters based on user options or inputs, as shown in item 4.

Formatting the DTD graph with annotations, as shown in block 640', is the next stage for preparation of the result DTDSA. A simple recursive technique can traverse the DTD graph to identify the constructs visited, and at the same time, in item 1. insert the graph in the original DTD text format. In accordance with item 2., during the traversal, any annotations associated with a node are found, the value or binding specifications are printed, immediately following the text of the DTD construct that corresponds to the node. Value specifications are inserted with a prefix ":", and binding specifications are inserted with a prefix "::" Also, for any binding specification, the binding variable is inserted first, followed by ":=", and then the binding formula or function.

Generating XML Documents Based on the Mapping

Now the description will proceed from a discussion of the nature of the mapping and how it is generated to a discussion of how the mapping is used to generate XML documents.

When a mapping between DTD and the data sources has been established, using the DTDSA technique described above, XML documents can be created by
  (1) using the DTD as a template for building the XML documents and
  (2) supplying values to the parameters in the various specifications we associated with DTD constructs and then using these specifications as the construction instructions.

In the preferred embodiment, values are assigned to the parameters used in the various specifications which are not also binding variables. Then starting from the root DTD element, each DTD element is recursively instantiated into at least one XML element. In the instantiation process, value specifications are used
  (1) to determine the value to be assigned to each #PCDATA or attribute definition, and
  (2) to determine which child to instantiate in a choice list.

The binding specifications are used
  (1) to determine how many instances a child DTD construct should be instantiated into when the DTD construct ends with a repetition symbol, and
  (2) to associate values with parameters in the specifications useful in instantiating descendant DTD constructs.

More specifically, rules are recursively defined for instantiating individual DTD constructs when all the needed parameters (for their corresponding binding or value specifications) are known. The method for generating XML documents based on the mapping is simply as follows:

1. Read the DTD, the mapping, and input values.
2. Prepare input values for the parameters defined in the last (tail) binding specification of the DTD root element ED, and make a set of variable/value pairs called the "environment", $Env_0$. For every DTD element there will be a different environment $Env_i$.
3. Starting from the root element,
    a. Using the incoming $Env_i$, instantiate every DTD construct (including the root ED) in some tree traversal, for example a breadth first search (BFS) traversal order. In other words, use a first-in-first-out queue to collect all the subexpressions that need to be instantiated after applying the instantiating rules to the current DTD construct.
    b. For an ED or AD with nested binding specifications (with a potential inner most value specification), resolving the binding specifications from the tail (outer most) working towards the head (inner most), please see the section on the tail absorbing rule, below. This step resolves and moves all but the head binding specification into $Env_i$.
    c. Env may be modified during steps 3.b and 3.c, pass along the new Env to all children of the current DTD construct.
4. Follow step 3 to obtain a result XML document.

DEFINITIONS USED IN THE CREATION OF XML DOCUMENTS

A. An environment Env is a set of bindings, e.g., $\{x=1, y=2, z=5\}$.

B. Suppose bspec is a binding specification. Bnd(bspec, n, env) denotes the nth binding specified by bspec, under the environment Env.

C. Eval(E, Env) denotes the function that evaluates the algebraic expression E using bindings in the environment Env. If a parameter in E is not in Env, Eval( ) will prompt user to input a value. For example, Eval(x+1, $\{x=1\}$)=2, Eval("XM"+x, $\{x="L"\}$)="XML", and Eval(y+3, $\{z=1\}$), in which case Eval( ) will prompt user to input a value for y.

D. Ival(C, Env) is the function of instantiating any DTD construct C using the bindings in Env.

The Tail Absorbing Rule for Resolving Nested Binding Specifications

Suppose DTD construct C has nested binding specifications, $bspec_1, bspec_2, \ldots, bspec_n$, with incoming bindings specified in $Env_n$. The rule absorbs all but the first (inner most) binding specifications.

$$Ival(C + bspec_1 + \ldots + bspec_n, Env_n)$$
$$= Ival(C + bspec_1 + \ldots + bspec_{n-1}, Env_{n-1}))$$
$$= \ldots$$
$$= Ival(C + bspec_1, Env_1),$$

where $Env_i = Env_{i+1} + Bnd(bspec_{i+1}, 1, Env_{i+1})$, for $i = n-1, n-2, \ldots, 1$.

The Instantiation Rules for Individual DTD Construct:

For ease of presenting, the terms in capital letters are DTD constructs, and the same terms in small letters denote instances of corresponding DTD construct. For example, ED denotes the element type definition construct, and ed is an instance of ED.

ED and AD with binding specification bspec:

$$Ival(ed+b\text{spec},Env)=Ival(ed,Env+Bnd(b\text{spec},1,Env))$$

$$Ival(ad+b\text{spec},Env)=Ival(ad,Env+Bnd(b\text{spec},1,Env))$$

ED: assume $ad_1, ad_2, \ldots, ad_i$ are ADs associated with this ED, i.e., ed, and CS is the content-spec of ed. Also, let TagEd be the ENAME of ed.

$$Ival(ed, Env) = \text{``} < TagEd\text{''} + Ival(ad_1, Env) + Ival(ad_2, Env) + \ldots +$$
$$Inval(ad_1, Env) + \text{``}/>\text{''}, \qquad \text{if } CS \text{ is EMPTY}$$

-continued $$\text{or } ``<TagEd" + Ival(ad_1, Env) + Ival(ad_2, Env) + \ldots + Ival(ad_i, Env) + ``>" +$$

$$Ival(CS, Env) + ``</TagEd>", \quad \text{otherwise}$$

CP: assume the content particle cp has a single binding specification bspec, with k bindings.

If $cp = cu + `` * " + bspec$, $Ival(cp, Env) = Ival(cu, Env + Bnd(bspec, 1, Env)) +$ $Ival(cu, Env + Bnd(bspec, 2, Env)) + \ldots +$ $Ival(cu, Env + Bnd(bspec, k, Env))$, if $k > 0$ $= `` "$, if $k = 0$ If $cp = cu + `` + " + bspec$, $Ival(cp, Env) = Ival(cu, Env + Bnd(bspec, 1, Env))$ $Ival(cu, Env + Bnd(bspec, 2, Env)) +$ $+ \ldots + Ival(cu, Env + Bnd(bspec, k, Env))$, = if $k > 0$ user provided default value, if $k = 0$ If $cp = cu + `` ? " + bspec$, $Ival(cp, Env) = Ival(cu, Env + Bnd(bspec, 1, Env))$, if $k > 0$ $= `` "$, if $k = 0$ CU: assume the content unit cu has a single binding specification bspec. Let clist denote an instance of choice list or terminal choice list constructs.

If cu=clist+bspec,

Ival (cu, Env)=Ival (Alt$_k$, Env), where Alt$_k$ is the kth alternative of clist.

If cu=seq+bspec,

Ival(cu, Env)=Ival (seq, Env+Bnd(bspec,1,Env))

If cu=ename+bspec,

Ival (cu, Env)=Ival(ed, Env+Bnd(bspec,1,Env)), where ed is the ED that defines ename.

SEQ: assume seq is a sequence of k CPs, i.e., seq=(cp$_1$, cp$_2$, . . . , cp$_k$).

Ival (seq, Env)=Ival (cp$_1$, Env)+Ival (cp$_2$, Env)+ . . . +Ival (cp$_k$, Env)

PCDATA: assume pcdata (of #PCDATA construct) has a value specification vspec.

Ival(pcdata+vspec, Env)=Eval(vspec, Env)

AD: assume the attribute list declaration ad has k ATDs, with atd$_i$ as its ith attribute definition, and ename$_i$ is the attribute name of atd$_i$.

$$Ival(ad, Env) = ename_1 + `` =" + Ival(atd_1, Env) + `` " +$$

$$ename_2 + `` =" + Ival(atd_2, Env) +$$

$$`` " + \ldots + ename_k + `` =" +$$

$$Ival(atd_k, Env)$$

ATD: assume atd (of ATD construct) has a value specification vspec.

$$Ival(atd, Env) = Alt_i, Eval(vspec, Env) = I, \quad \text{if } atd \text{ is an enumerated type,}$$

$$= Eval(vspec, Env), \quad \text{otherwise}$$

Extract Variation:

If the mapping is established using the scheme labeled Mapping variation, we use a variation of the extract scheme to generate XML value from the mapping. The extract variation consists of all the above extraction steps, plus one addition rule:

Assign XML-text-block: assume cnstr is a DTD construct with a value spec vspec which identifies or produces an XML text segment.

Ival(cnstr+vspec)=Eval (vspec, Env)

We can optionally validate whether the value produced by Eval(vsepc, Env) conforms with the DTD in question.

Figure 7A:
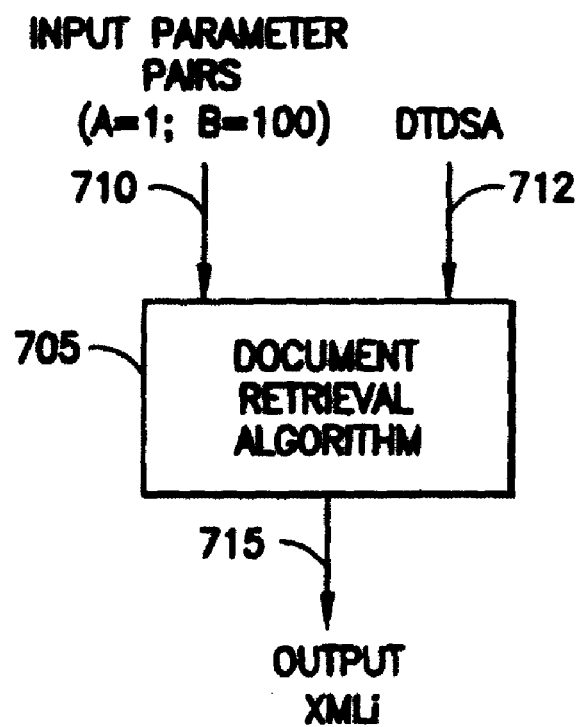
FIGS. 7a & b show an algorithm for generating XML using a DTDSA

FIGS. 7a & b show block diagrams for the XML composition algorithm using DTDSA according to the present invention.

In FIG. 7a, a document retrieval and composition algorithm 705 receives input parameter name and value pairs 710, e.g., <A=1, B=100>, and generates a return XML document 715 based on the provided DTDSA 712.

Figure 7B:
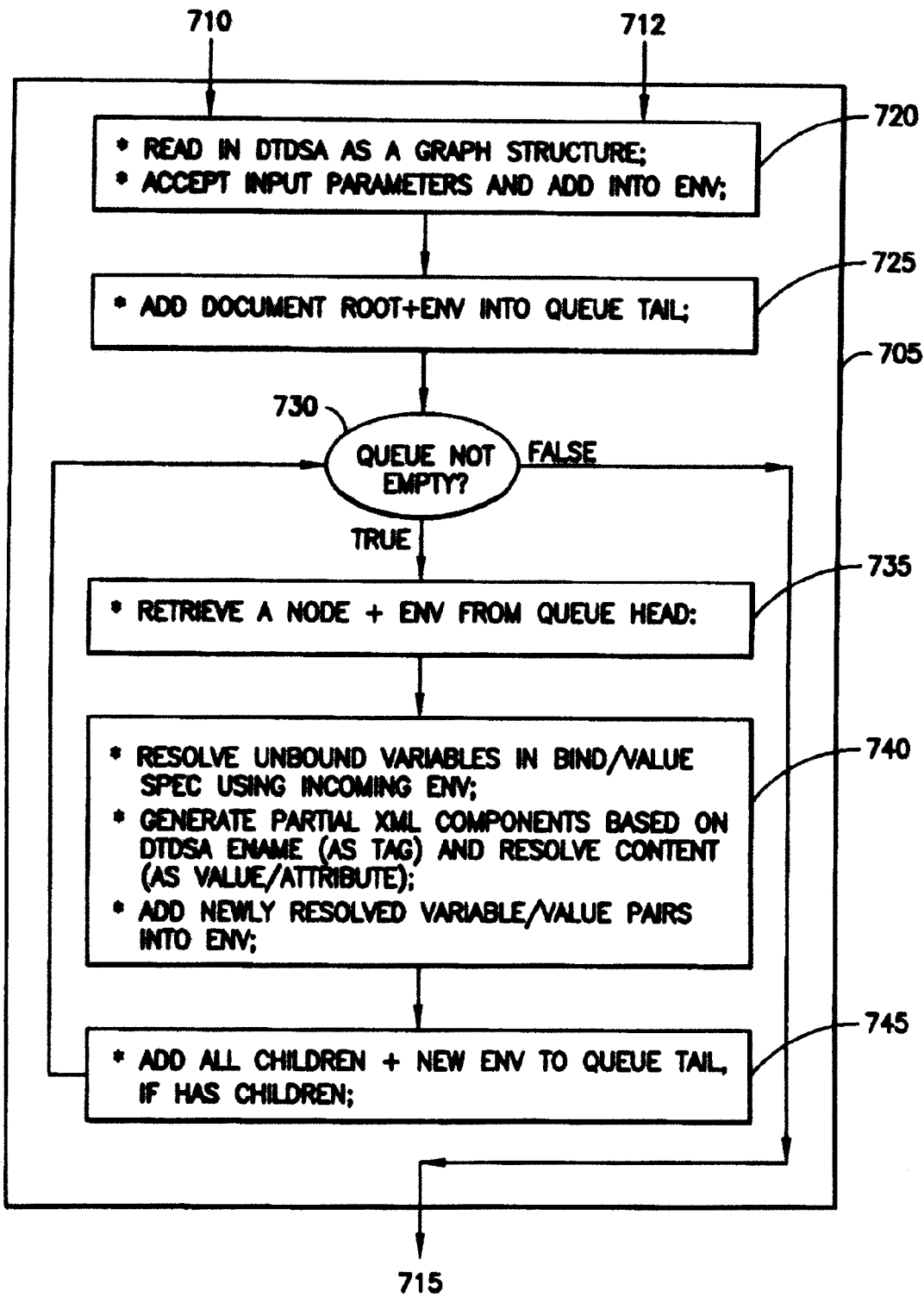

An internal flow diagram of the algorithm 705 is shown in FIG. 7b. Initially, the algorithm parses the DTDSA 712 into some internal format, e.g., a directed acyclic graph, which is easy to manipulate, and prepares the input parameters into environmental variables as depicted in block 720. The algorithm then performs a breadth first search (BFS) traversal on the internal DTDSA structure, using a first-in-first-out queue to keep track of the set of structure nodes visited. The BFS traversal includes a standard procedure which needs to set up initial values (the document root and initial environmental variables) for the queue at 725, repeats fetching the queue until the queue is empty at 730, and for every node and environmental variables fetched at 735, performs suitable operations at 740 to generate partial XML components and adds all the children nodes and new environmental variables/ values to the queue 745. As shown in block 740, the operations for a visited node, denoting a data type or attribute type, include (1) resolving unbound variables, which are associated with the data type or attribute, and defined in binding or value specifications in the DTDSA, using the fetched environmental variables/values; (The resolution of unbound variables may involve accessing data sources and predefined function calculation.)

(2) generating partial XML components based on current DTDSA node name (ENAME) as the tag, and the resolved content as the value or attribute;

(3) adding the newly created variable/value pairs into the environmental variables.

FIG. 8a shows the type of directed acyclic graph generated in item 712. A data composition flow is shown over the DTDSA directed graphical structure. A data type is denoted by a circle node as depicted in 835, and terminal #PCDATA by oval shaped node 840. The dotted line across directed edges denotes choice list for children nodes at 825, and an edge marked with a "*" at 820 denotes a repeatable and optional child data type in the document. The initial environmental variables/values 805, $ENV_0$, is operated on the document root 835, which has an associated binding specification D:=f(A) 810, a function that depends on environmental variable A 808 and produces a value for the environmental variable D. The resolved D variable/value pair as shown in 815 is added into environmental variables/values, $ENV_2$ as shown in 812, and passed along to child node. Not shown in the figure, the choice list as illustrated in 825 should have an associated binding specification whose resolution can lead to finding the child from the choice list to visit next. The flow will reach the leaf nodes, such as #PCDATA node shown in 840, and CDATA node for attribute definition not shown in the figure. The leaf nodes have associated value specifications, e.g., g(D) as shown in 830, which can be resolved using the incoming environmental variable/value pairs.

Figure 8:
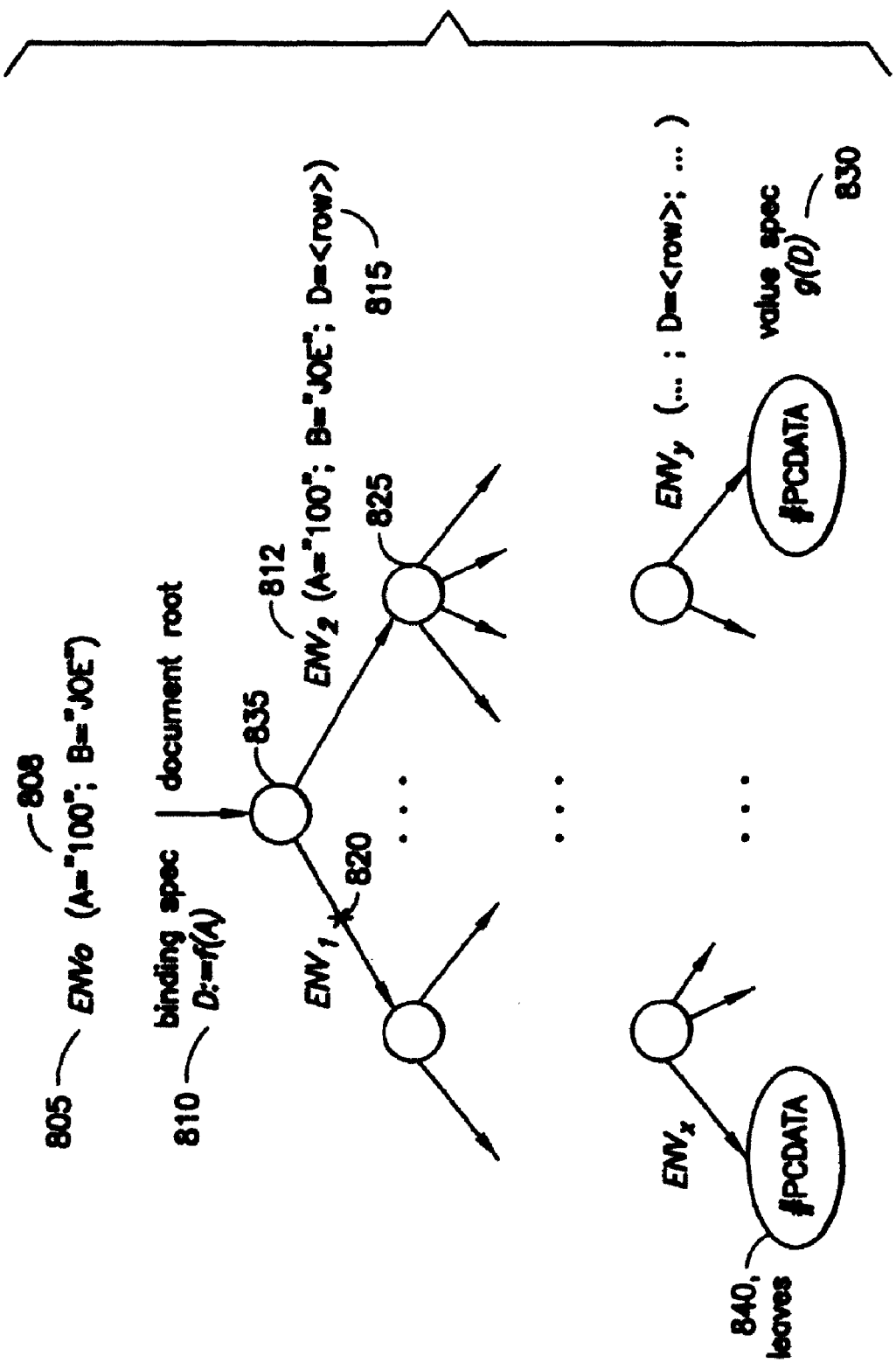
FIG. 8 shows an XML composition data flow
Figure 9:
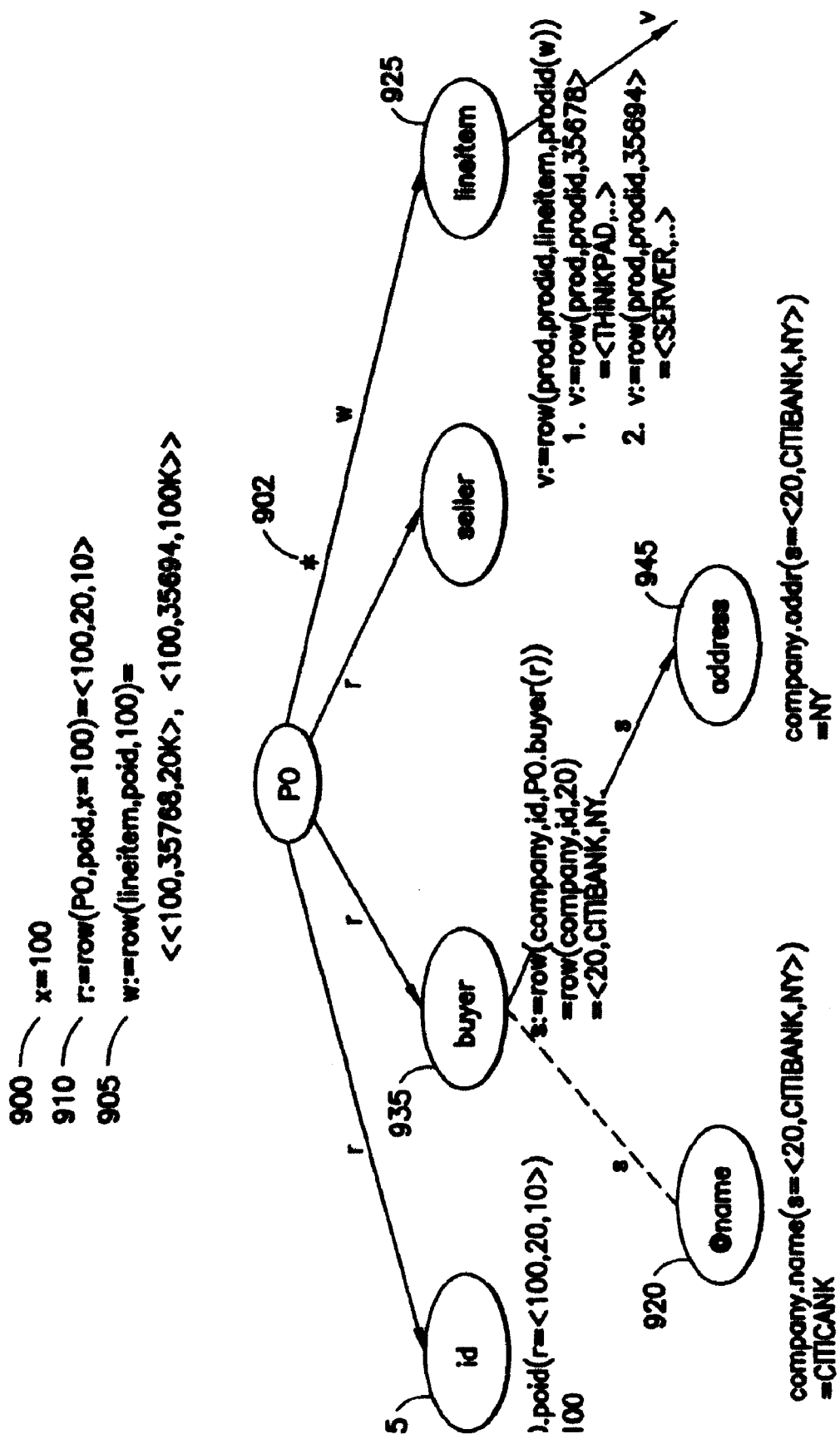
FIG. 9 shows an XML composition example with input x=100

FIG. 9 shows a directed acyclic graph, like FIG. 8, but specifically related to the example of FIGS. 3a, 3b, and 5. An illustrative example is shown for a partial resolution sequence when an input value 100 is assigned to variable x as shown in 800 based on the algorithm as shown in FIGS. 7a & b, the DTDSA as shown in FIG. 5, and relational schema as shown in FIG. 3a. A sequence of resolutions occurs based on the BFS traversal order. The resolutions at numerals 905, 910, 915, 920, 925, 935, and 945 correspond to the binding/value specs at numerals 505, 510, 515, 520, 525, 535, and 545 respectively. The resolution for the binding spec at numeral 510 using x=100 involves table PO access with poid=100 and derives into a record <100,20,10> for r as shown in 910. The binding spec in 505 uses the record r to derive its third argument, PO.poid(r), to 100, which is needed to resolution of w, i.e., row(lineitem,poid,100). Since there are two records in table lineitem with POID=100, as shown by numerals 330 and 335 in FIG. 3a, w is assigned the two records as shown at numeral 905. Such binding can be used to derive multiple occurrence of a data type along the edge marked with "*" or "+" as shown at numeral 902. The two records for variable w can be used to derive two XML components lineitem as shown at numeral 925. Attribute values with value spec can also be similarly derived. For example, as shown at numeral 920, the attribute name with a "@" prefix of data type buyer can have a resolved value s from deriving the binding spec at numeral 535 using r as shown at numeral 935.

FIG. 10 shows the retrieved XML document for the example depicted in FIGS. 3a, 3b, 5, and 9. Based on the input x=100, the document is a PO with id 100. There are two line items retrieved and composed as shown at numerals 1010 and 1015. Attributes are also illustrated as shown at numerals 1005 and 1010.

From reading the present disclosure, other modifications will be apparent to persons skilled in the art. Such modifications may involve other features which are already known in the design and use of data conversion techniques and XML and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. The applicants hereby give notice that new claims may be formulated to such features during the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements.

We claim:

1. A computer method, comprising:
    executing at least the following operation in at least one data processing device, wherein the at least one data source comprises multiple heterogeneous data sources;
    establishing a mapping from lists and scalars corresponding to at least one data source into XML elements and attributes, wherein the mapping includes at least one respective specification corresponding to at least one respective XML element of the XML elements;
    using a pre-established Document Type Definition (DTD) corresponding to the multiple heterogeneous data sources; and
    based on the pre-established DTD and the multiple heterogeneous data sources, adding annotations to the pre-established DTD to create an annotated DTD, such that an XML document generated from the annotated DTD is guaranteed to conform to the pre-established DTD.

2. The method of claim 1, wherein the at least one data source comprises at least two data sources, and the data sources are of different types.

3. The method of claim 1, wherein the data source is a relational database.

4. The method of claim 1, further comprising executing the following operation in the data processing device: expressing the mapping in constructs of a mapping language.

5. The method of claim 4, further comprising executing the following operation in the data processing device: inserting the constructs into the pre-established DTD to create the annotated DTD.

6. The method of claim 5, wherein the constructs comprise at least one of a value specification and a binding specification.

7. The method of claim 5, wherein
    at least one of the constructs comprises at least one parameter;
    the at least one of the constructs is adapted so that a value of the at least one of the parameters is determinable at a time of generation of at least one respective XML element associated with the at least one of the constructs.

8. The method of claim 5, wherein the annotated DTD comprises machine readable code embodied on a non-transitory machine readable medium, the code comprising
    the pre-established DTD relating to an XML format; and
    annotations inserted into the pre-established DTD relating to a data source format.

9. The method of claim 1, further comprising executing the following operation in the data processing device: associating values and or formulas with the pre-established DTD.

10. The method of claim 9, wherein the associating includes associating one or more lists of data objects or formulas producing data objects with each DTD construct having a repetition symbol at the end.

11. The method of claim 9, wherein the associating includes associating one or more lists of data objects or formulas producing data objects with each DTD construct which is not a #PCDATA, a choice list, or an attribute list, and does not end with a repetition symbol.

12. The method of claim 9, wherein associating includes associating a value or formula producing a value with each PCDATA, choice list, or attribute definition.

13. The method of claim 9, wherein associating includes, not necessarily in the following order:

first associating one or more lists of data objects or formulas producing data objects with a DTD construct;
second associating at least one of the lists or formulas with at least one variable name; and
using the variable name as a parameter in at least one other formula.

14. The method of claim 1, further comprising executing the following operation in the data processing device: associating at least one respective environment with a respective XML element to be generated.

15. The method of claim 14, wherein the at least one environment comprises information from a parent XML element of the respective XML element; and information from a binding specification of a DTD construct associated with the respective XML element.

16. The method of claim 14, wherein
the specification comprises at least one parameter for receiving a value upon generation of an XML document; and
the method further comprises, upon generation of an XML document, sending the at least one parameter a value according to at least one variable/value pair in the at least one respective environment.

17. The method of claim 1, wherein the mapping is responsive to a user mapping specification.

18. The method of claim 1, wherein the at least one data source comprises at least two data sources, and the data sources are of different types.

19. The method of claim 1, further comprising executing additional operations, the additional operations comprising
embodying the mapping in a machine readable form within the data processing device;
using the mapping to generate an XML document from the data source, the XML document being embodied in a machine readable form.

* * * * *